Patented June 22, 1937

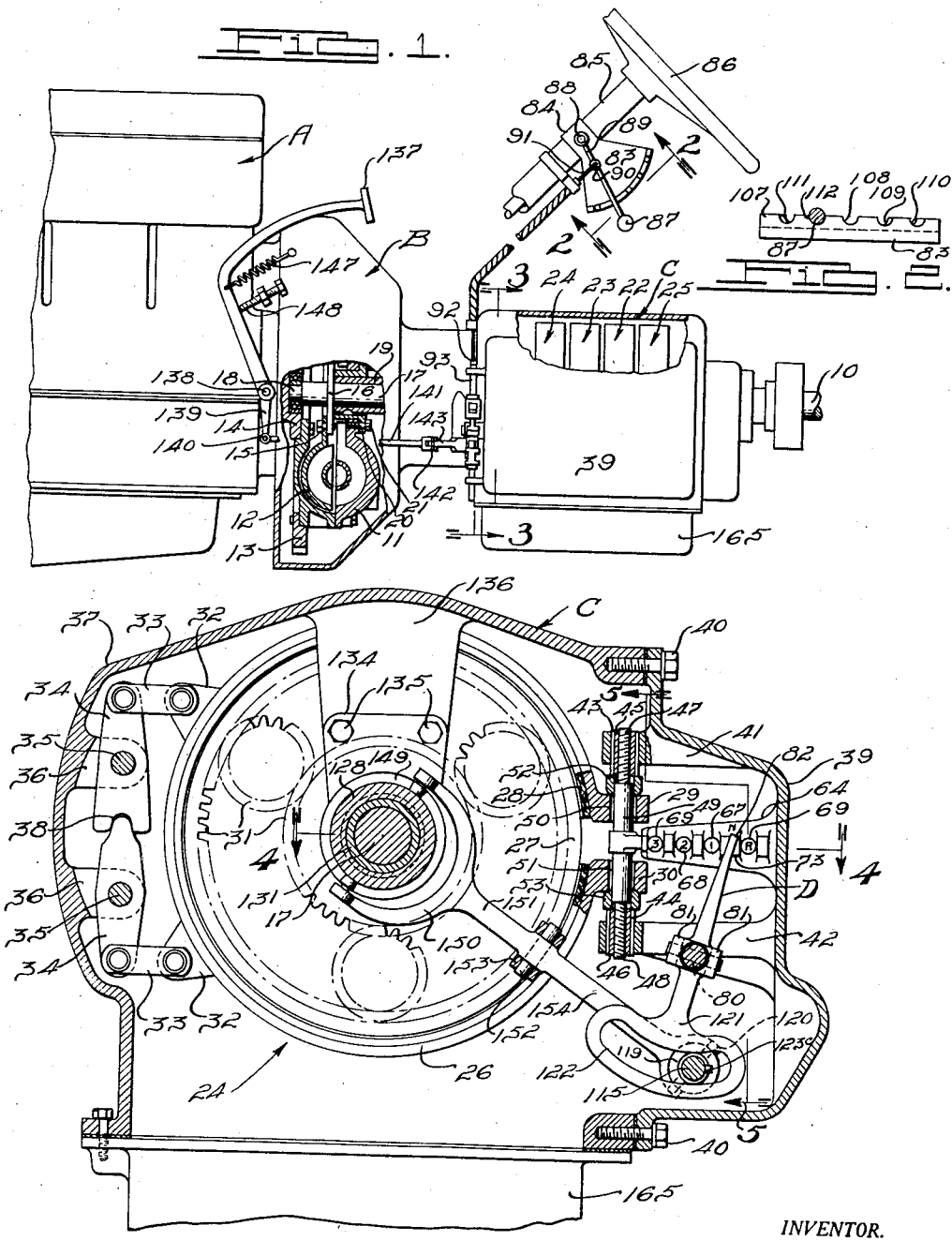

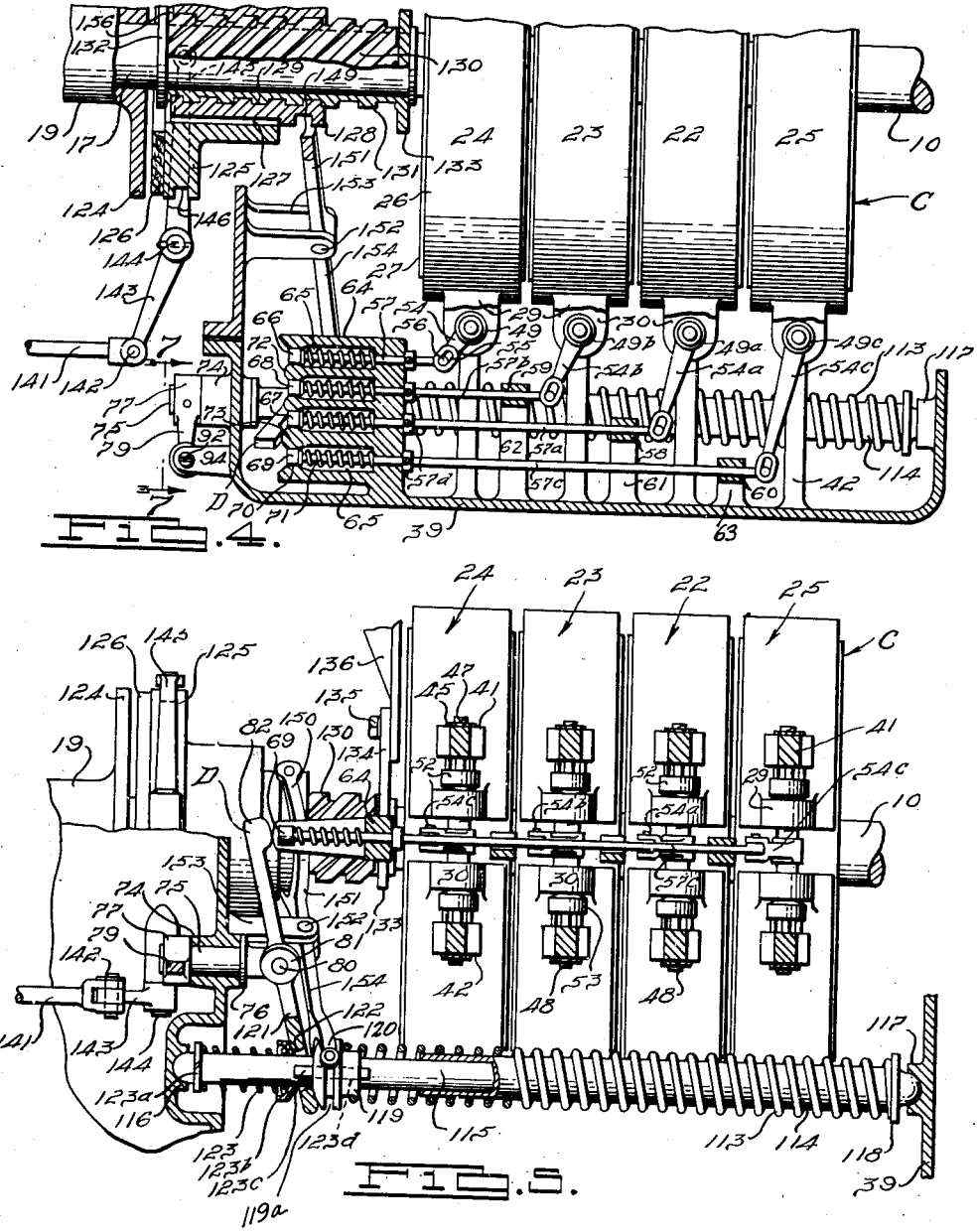

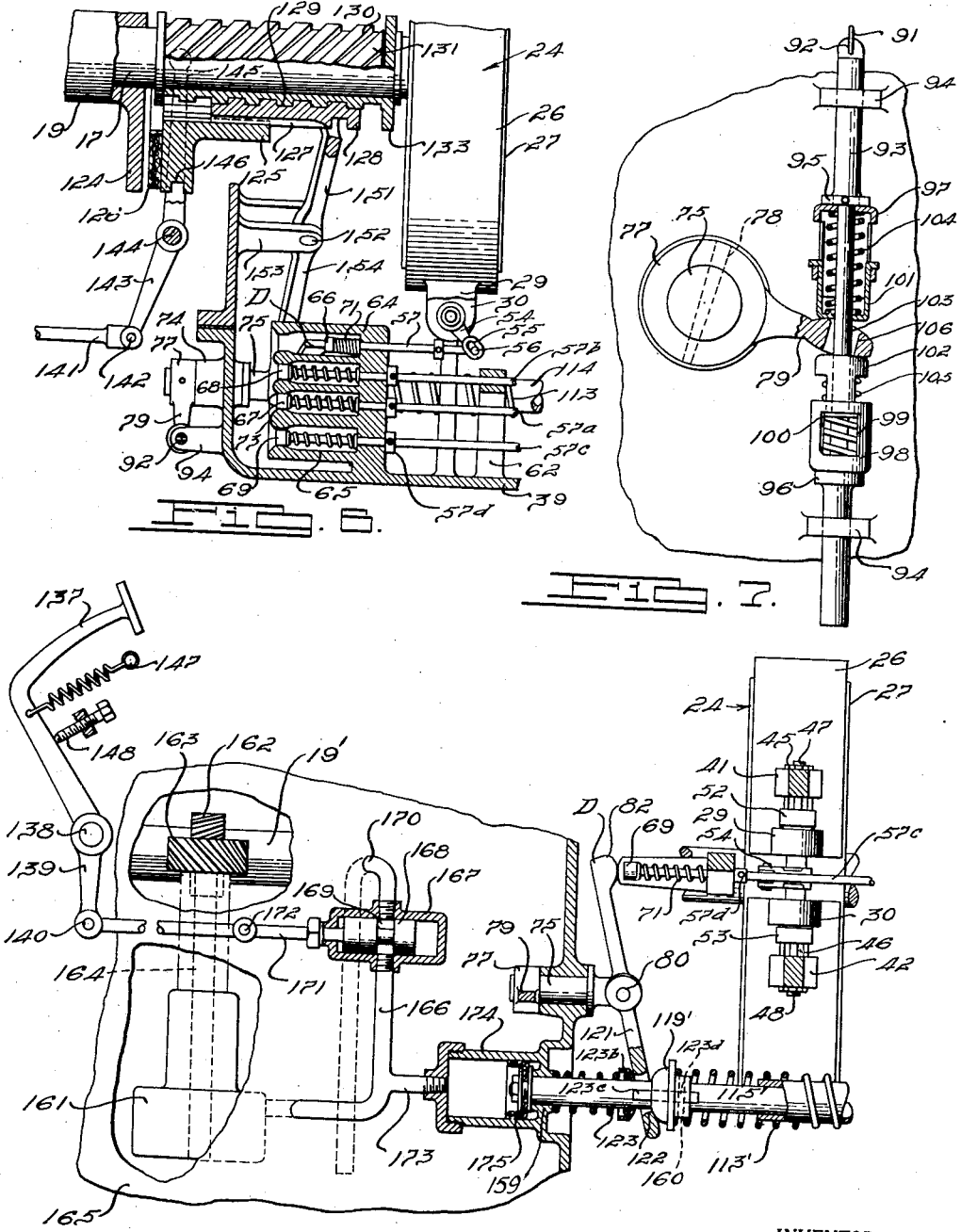

2,084,592

UNITED STATES PATENT OFFICE 2,084,592

MOTOR VEHICLE POWER TRANSMISSION

Herbert F. Patterson, Detroit, Mich., assignor to Chrysler Corporation, Detroit, Mich., a corporation of Delaware Application May 11, 1934, Serial No. 725,222

26 Claims. (Cl. 74—262)

This invention relates to power transmission devices and refers more particularly to improvements in power transmission devices especially adapted for use in connection with motor vehicles, although not necessarily limited thereto.

My invention, in certain more limited aspects thereof, provides improvements in the drive and control for power transmission systems of the type including the well-known epicyclic or planetary transmission gear box. With such planetary transmissions, it is customary to arrange the gearing to provide for the desired number of speed ratios between the engine and vehicle driving ground wheels and such gearing is customarily selected and controlled to obtain the desired driving speed ratio by actuation of any one of a group of transmission gearing controlling clutches usually consisting of reaction brake bands associated with and controlling the rotation of corresponding drums or similar elements of the various planetary gear trains.

One object of my invention resides in the provision of an improved selector and actuating mechanism for obtaining the several speed ratios provided by the transmission or other speed changing mechanism, the latter preferably being of the planetary gear type although not necessarily limited thereto in the broader aspects of my invention.

A further object of my invention is to provide selectively adjustable means adapted for movement into operative association with each of the speed ratio controlling devices of the transmission. More particularly, according to one embodiment of my invention, this common means may be in the form of an adjustable element adapted to be selectively positioned in response to a manually actuated selector controlling device. This adjustable element preferably controls or forms an operative connection between a power operating means and the various transmission speed ratio controlling devices.

A further object of my invention, in the more limited aspects thereof, is to provide a selectively adjustable actuating lever preferably adjustable in response to manual manipulation by the vehicle driver for selectively controlling or establishing an operative connection between a suitable power operating means and the various transmission speed ratio controlling devices.

Where a planetary gear type of transmission is employed in connection with my invention, the aforesaid common actuating element or lever is adapted to selectively control or operably connect a power actuating means selectively with the various braking devices for the respective planetary gear trains so as to selectively operate the braking devices in response to manual selection by the motor vehicle driver.

A further object of my invention resides in the provision of improved controlling and actuating mechanism for selecting and manipulating the various gear trains of a transmission, particularly a planetary type of transmission, whereby improved means is provided responsive to manual control by the motor vehicle driver for automatically bringing about a complete cycle of gear ratio change.

A further object of my invention resides in the provision of means for utilizing the vehicle driving engine or a part driven therefrom to furnish the necessary power for actuating the several speed ratio controlling devices or braking means in the case of a planetary transmission. This power actuating means is preferably arranged to release the aforesaid speed ratio controlling devices although, if desired, the power means may be arranged to actuate these devices. Where my improved power means is used to release the speed ratio controlling devices as aforesaid, I preferably provide other power means such as a relatively heavy spring or equivalent power means to actuate the various speed ratio controlling devices, the operation of the two power means preferably being under control of the vehicle driver.

A further object of my invention is to provide an improved preselector arrangement whereby the vehicle driver may manually select for the desired transmission speed ratio in advance of the speed ratio change, the change in speed ratio preferably occurring, according to this phase of my invention, in response to operation of a further manually controlled device such as a foot pedal, for example.

A further object of my invention, according to one modified embodiment thereof, is to provide a fluid pressure operating means in the place of the aforesaid engine power operating means for releasing or actuating the various transmission speed ratio controlling devices. The fluid pressure medium employed in this embodiment of my invention may be oil under pressure, air under pressure either above or below atmospheric pressure, or other suitable fluids. I prefer, with this form of my invention, to provide the power operating means adapted for actuation by oil pressure.

A planetary type of transmission presents a number of advantages over the more conventional sliding gear types of transmissions, and my invention is therefore primarily directed toward planetary types of transmissions and power transmission systems employing planetary gearing speed ratio controlling devices although, as aforesaid, the fundamental principles of my invention may, if desired, be employed in connection with transmissions of other types including the aforesaid sliding gear types of transmissions. By way of example in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. That is made possible by reason of the fact that the braking devices associated with the respective planetary gear trains are, in effect, clutches in that each rotary drum controlling a planetary train is frictionally engaged by its associated braking means.

Further objects and advantages will be apparent from the following detailed description of several illustrative embodiments of the principles of my invention, reference being had to the accompanying drawings, in which:

Fig. 1 is a side elevational view illustrating my power transmission mechanism as a whole, portions of the transmission and clutch casings being broken away to illustrate the speed ratio gear train controls and main clutch parts respectively.

Fig. 2 is a detail side elevational view partly in cross section illustrating the manual selector device.

Fig. 3 is a sectional elevational view through the transmission illustrating one of the speed ratio controlling devices and parts associated therewith, the section being taken along the line 3—3 of Fig. 1.

Fig. 4 is a sectional plan view showing the power operating means for the speed ratio controlling devices, the section being taken along the line 4—4 of Fig. 3.

Fig. 5 is a sectional elevational view illustrating the mechanism shown in Fig. 4, the section being taken along the line 5—5 of Fig. 3.

Fig. 6 is a view corresponding to Fig. 4 showing the power operated means in another position of its actuation.

Fig. 7 is a detail side elevational view looking along the line 7—7 of Fig. 4, and illustrating the preselector mechanism for the adjustable actuating means.

Fig. 8 is a fragmentary view corresponding to Fig. 5 but illustrating a modified form of my invention, the fluid operated means illustrated therein being shown in somewhat diagrammatic form.

Referring to the drawings, I have illustrated my invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through a power take-off shaft 10 which, as usual, may extend rearwardly of the vehicle to drive the usual ground wheels (not shown).

The clutch B may be of any suitable construction for controlling the drive between engine A and transmission C, this clutch being illustrated in Fig. 1 in the form of a fluid type having the usual driving and driven cooperating vane members 11 and 12 respectively. The driving vane member 11 is carried by the engine flywheel 13, the latter being connected as usual with the rear end of the engine crank shaft 14. The driven vane member 12 is connected at 15 to a flange 16 of a driven shaft 17, this shaft having a forward extension 18 piloted in the rear end of the crank shaft 14. The driven shaft 17 extends rearwardly to drive the power take-off shaft 10 through the intermediary of the various gear trains of transmission C.

Where the engine power is utilized, according to one feature of my invention, to provide power means for operating the speed ratio transmission controlling devices, such drive may be provided by reason of a driving sleeve or hollow shaft 19 mounted on the shaft 17 but rotatable independently thereof. The sleeve 19 has a hub 20 keyed or otherwise fixed thereto and the hub is connected at 21 with the driving vane member 11 of the clutch so that even when the driven vane member 12 is not being operated from the driving member 11, the sleeve 19 will be rotatably driven with the engine crank shaft 14 and flywheel 13. The operation of the sleeve 19 will be more apparent hereinafter.

I have illustrated a fluid type of clutch B since a clutch of this character has a number of advantages in connection with a transmission of the planetary gear type C. Thus, the fluid type of clutch is desirable in providing a smooth drive for the vehicle through the planetary transmission, relatively high power driving efficiency, release of effective drive between the engine and the vehicle driving wheels when the engine is idling and with the transmission manipulated to establish one of its driving gear ratio settings, and other well-known favorable characteristics. I desire to point out that other types of clutches may be employed to control the drive between engine A and transmission C, if desired. For example, the well-known type of friction clutch may be employed and may be manually operated or automatically operated by the well-known commercial type of vacuum clutch releasing mechanism as will be readily understood.

I have illustrated the change speed transmission C as the epicyclic or planetary type, this general form of transmission being well-known in the art, and, as usual, includes a plurality of transmission speed ratio controlling clutches or brakes 22, 23, 24, and 25, these braking devices being respectively adapted to actuate the transmission in its first speed ratio or low gear, second speed ratio or intermediate gear, third speed ratio, and reverse drive.

The typical brake device 24 illustrated in Fig. 3 consists of an outer band 26 which substantially surrounds the drum 27, the band being provided with friction braking material 28 carried by the band and adapted for frictional engagement with drum 27. The band 26 has its ends formed with laterally projecting actuating flanges 29 and 30 positioned adjacent each other, means being provided to move the band ends toward each other to contract the band 26 for causing the friction material 28 to brake the rotary drum 27, the band having sufficient inherent resilience to expand away from contact with the drum when the actuating means is relieved at the flanged ends 29 and 30. In Fig. 3 the third speed ratio braking device 24 is illustrated in its inoperative position whereby the drum 27 is free to rotate through operation of the planetary gear set 31 somewhat diagrammatically illustrated in association with the drum 27. When the braking device 24 is actuated by contracting the band 26, the drum 27 is held against rotation, the driven shaft 10 in such instance being operated through the planetary gearing 31 to provide the third speed drive for the motor vehicle.

In order to anchor the band 26 and to substantially equalize the braking forces applied to drum 27 around the periphery thereof so as to substantially avoid a tendency toward lateral loading of the drum and planetary gearing transverse to the axis of the drum, I have provided the band with the circumferentially spaced anchoring flanges 32. The flanges 32 are connected through links 33 with the levers 34 pivotally mounted at 35 with the supporting brackets 36 of transmission casing 37, the levers 34 being interlocked at 38 so that movement of one of the flanges 32 will be transmitted through the pivotal levers 34 and the links 33 to the other portion of the band associated with the anchoring device. The links 33 are thus pivotally connected at their opposite ends respectively with the anchors 32 and levers 34.

The transmission C has an opening longitudinally along one side thereof, this opening being closed by a removable casing cover 39 removably secured to the transmission through suitable fasteners 40. The cover 39 is provided with the vertically spaced inwardly extending supporting brackets 41 and 42, these brackets being formed with co-axial openings 43 and 44, respectively. Splined within the openings 43 and 44 are the nuts 45 and 46 and these nuts in turn are axially and oppositely threaded to receive the threaded ends 47 and 48 of an operating oscillatory shaft 49.

The shaft 49 extends through openings 50 and 51 respectively formed in the band flanges 29 and 30, these openings preferably having considerable clearance with shaft 49 so as not to bind on the shaft when the band is contracted and expanded. In order to transmit the thrust of the nuts 45 and 46 to the flanges 29 and 30, I have provided the intermediate washers 52 and 53, these washers having a lower rounded face engaging the edge of the openings 50 and 51, respectively, so as to facilitate the operation of band movement and relieve distorting loads at the threaded portions of shaft 49 during the operation of the band.

The operating shaft 49 of the third speed braking device 24 is provided with a laterally extending actuating lever 54 having a slotted outer end 55 for receiving the operating pin 56 carried by the rearwardly extending end of the third speed operating rod 57 hereinafter more clearly described.

In operation of the third speed transmission controlling device or brake 24 as thus far described, it will be apparent that when the rod 57 is operated rearwardly to cause the pin 56 to swing the lever 54 in a counterclockwise direction as viewed in Fig. 4, the operating shaft 49 will be given a rotary movement. This rotary movement operates through the oppositely threaded ends of the shaft to cause the nuts 45 and 46 to move inwardly toward each other in their splined openings 43 and 44, respectively, this movement acting through washers 52 and 53 to contract the band ends 29 and 30 whereby the third speed drum 27 has its rotation checked for establishing the third speed drive through the transmission. When the rod 57 is moved forwardly, the parts controlled thereby operate in the opposite direction and the band 26 is expanded to permit the drum 27 to again rotate and thereby relieve the drive through the transmission controlling device 24.

In order to avoid repetition, I have not illustrated all of the details of the brake operating means associated with the controlling devices 22, 23, and 25, it being understood that this operating means is similar to that described in connection with the controlling device 24 with the exception that the actuating levers preferably have relatively different lengths in order to position the operating rods associated therewith in horizontal or lateral alignment. Thus, the controlling devices 22, 23, and 25 have operating shaft 49$^a$, 49$^b$, and 49$^c$ respectively, these shafts having operating levers 54$^a$, 54$^b$, and 54$^c$ corresponding to the lever 54 of shaft 49 associated with the third speed controlling device 24. Likewise the aforesaid controlling devices have their respective levers adapted for operation by the operating rods 57$^a$, 57$^b$, and 57$^c$, these rods being respectively slidably supported in guides 58, 59, and 60 carried by the transmission cover 39 through inwardly extending brackets 61, 62, and 63.

It will be noted that the rods for operating the aforesaid levers extend forwardly in substantially the same horizontal plane, the rods being slidable through a casing 64 projecting inwardly from the transmission cover 39. The casing 64 has a plurality of forwardly extending cylindrical openings 65 spaced inwardly of cover 39 for receiving the forwardly extending ends of the rods 57, 57$^a$, 57$^b$ and 57$^c$. These rods have cylindrical terminal portions 66, 67, 68 and 69, respectively, these terminal cylinders being guided for sliding action in the forwardly opening cylindrical guides 70. Within each opening 65 and surrounding each of the aforesaid rods is a spring 71 acting on the terminal portions of the respective rods for urging these rods forwardly so as to normally release the various braking devices. Secured to each of the rods is a collar 57$^d$ engageable with casing 64 to limit forward movement of the rods and to thereby limit expansion of the brake bands 26 operably connected to the respective rods.

The forward face of casing 64, as will be best seen in Figs. 3 and 4, is provided with oppositely beveled guides 72 whereby, as will be presently apparent, the operating element for contact with the terminal portions of the operating rods will be guided for selective contact with the terminal portions. The forward face of the casing 64 is provided with a flattened portion 73 intermediate the rod terminals 67 and 69, this portion 73 constituting the neutral portion of the casing 64 so that when the actuating element is engaged therewith the transmission will be in its neutral setting so that no drive will be transmitted therethrough to the take-off shaft 10.

I will next describe the common operating means or actuating element which is adapted for selective contact under manual control with the various rod ends 66, 67, 68 and 69 and also with the neutral face 73 for respectively operating the speed ratio controlling devices 22, 23, 24, and 25 and also for establishing a neutral condition in the transmission.

Referring now to Figs. 3, 4, and 5, the forward portion of cover 39 is provided with a longitudinally extending bearing 74 receiving a rocking shaft 75. This shaft is fixed against longitudinal movement by a rear flange 76 engageable with bearing 74 and a forward lever hub 77 which, as best seen in Fig. 7, is secured to shaft 75 by a pin 78. The hub 77 has a lever 79 projecting laterally therefrom for selectively oscillating shaft 75 as will be presently apparent. Fixed to the rear end of shaft 75 and extending transversely thereof is a pin 80. Mounted for oscillatory support on pin 80 is the aforementioned common actuating means and in the present form of my invention this means comprises a lever D provided with trunnions 81 rockingly supported by the pin 80.

The lever D has an upwardly extending operating end 82 adapted for selective registration with the aforesaid forward terminals or ends 66, 67, 68, and 69 and also with the neutral face 73 when the lever is selectively rotated on the pivotal shaft 75 by means of selective adjustment of lever 79. As will also be presently apparent, the lever D in any of its positions of selective adjustment (with the exception of the neutral position thereof) is adapted for swinging movement on the pin 80 so as to operate the lever end 82 rearwardly for rearward movement of the operating rods 57, 57ª, 57ᵇ and 57ᶜ.

I will next describe the manual controlling means adapted for operation by the vehicle driver for selectively adjusting the actuating lever D in the aforesaid positions. This manually controlled selector means is best illustrated in Figs. 1, 2, and 7 and comprises a stationary selector segment 83 conveniently positioned for access by the vehicle driver. Thus, the selector segment may be suitably clamped by a bracket 84 to the usual steering post 85 carrying the vehicle steering wheel 86, the selector segment 83 pivotally supporting a selector arm or lever 87 by a pivot 88. The selector arm has an arm portion 89 thereof to which is pivotally connected at 90 a suitable linkage herein illustrated as a Bowden wire mechanism 91. This mechanism extends for connection at 92 with a vertically reciprocating rod 93 slidable in guides 94 projecting forwardly from the transmission cover 39.

Referring to Fig. 7, the shaft 93 is formed with spaced flanges or abutments 95 and 96 respectively seating the cups 97 and 98. Each of these cups is formed with openings 99 slidably receiving the lateral flanges 100 of the respective companion cups 101 and 102 slidable on the reduced shaft portion 103. Surrounding shaft portion 103 are a pair of preloaded springs 104 and 105 respectively urging separation of the companion cups 97, 101, 98 and 102, the separating movement of the companion cups being limited by the flanges 100 carried by the inner cup members as aforesaid. The springs 104 and 105 are under an initial compression and the inner cup members 101 and 102 receive therebetween the laterally extending lever 79, this lever being provided with an opening 106 for receiving the shaft portion 103, the opening having sufficient clearance with the shaft portion so as to permit the swinging movement of the lever without binding.

By reason of the selector mechanism illustrated in Fig. 7, it is possible to selectively adjust the shaft 93 to yieldingly urge the lever 79 to a corresponding position of adjustment but in advance of adjusting movement of the lever. Thus, in Figs. 1 and 7 the lever 87 is illustrated in its position of engagement for neutral, and when the selector arm 87 is adjusted to another position, one of the springs 104, 105 may be further compressed depending on the direction of movement of shaft 93.

Returning for the moment to Figs. 1 and 2 it will be noted that the selector segment 83 is provided with an arcuate flange 107, the flange being provided with a series of arcuately spaced stops or notches 108, 109, 110, 111 and 112 adapted to selectively receive the selector arm 87, the selector arm having a slight springing movement to permit this adjustment and also to yieldingly hold the selector arm in engagement with the desired notch against accidental displacement therefrom. The aforesaid notches in the order mentioned and when engaged by the selector arm 87 are adapted to manipulate the transmission C into its speed ratio settings respectively for first or low speed, second speed, third speed, reverse, and neutral.

Let it be presumed that the selector arm 87 is adjusted from engagement with the neutral notch 112, as illustrated in Fig. 1 and Fig. 2, to a further position of adjustment in engagement with the first speed notch 108. This movement of the selector arm will act through the Bowden wire mechanism 101 to move shaft 93 upwardly. In the illustrated embodiment of my invention, the changes in the transmission speed ratio are not adapted to automatically respond to movement of the selector arm 87, the actuating lever D being held in any of its positions of selective adjustment until the motor vehicle operator actuates a further manually controlled means as will be presently apparent.

Therefore, in the assumed illustration, when the selector arm 87 is moved from neutral notch 112 into engagement with the first speed notch 108, the lever 79 will not thereby respond to the upward adjustment of shaft 93. This movement of shaft 93 serves to additionally load spring 105 causing the inner cup 102 to urge lever 79 upwardly as viewed in Fig. 7, the initial compression on spring 104 being materially relieved so that when the resistance to movement of lever 79 is relieved, the lever 79 will be moved upwardly until the springs 104 and 105 are balanced. In this manner the lever 79 is adjusted an amount corresponding to movement of the shaft 93 and the latter shaft may be adjusted prior to the response of movement therefrom of the lever 79. Similarly, when the shaft 93 is adjusted downwardly by reason of a clockwise movement of the selector arm 87 as viewed in Fig. 1, the spring 104 is compressed and the spring 105 is relieved so as to urge the lever 79 downwardly an amount corresponding to the movement of the adjusting rod 93.

I will next describe the power operating means for loading the actuating lever D in its operation for selectively actuating the various transmission speed ratio controlling devices 22, 23, 24, and 25. This power operating means, in the present embodiment of my invention, comprises a relatively strong spring 113 which surrounds a sleeve 114, the sleeve in turn receiving a fixed shaft 115. The shaft is mounted between supports 116 and 117 provided by the longitudinally spaced walls of the cover 39. The rear end of spring 113 acts against an abutment 118 and the forward end of the spring acts against a sliding sleeve or collar 119 which is freely slidable along the shaft 115. The collar 119 is provided with a groove 119ª for receiving the yoked lever end 120, the purpose of which will be presently apparent, this lever end in turn acting against the downwardly extending lever arm 121 which is a part of the actuating lever D.

The lever arm 121 is formed with an arcuate slot 122 curved about the pivot shaft 75, the shaft 115 extending through this slot whereby the power operating spring 113 may exert its force against the lever arm 120 in the various selective positions of adjustment of the lever D. The radial dimension of the slot 122 is also sufficient to accommodate the swinging movement of lever D about the pin 80 without producing a binding action between the lever and the shaft 115.

In operation of the foregoing power means, it will be apparent that when the adjusting lever D is positioned under control of the manually operated selector mechanism into engagement with any of the aforesaid rod ends 66, 67, 68 and 69, the spring 113, under control as will be presently apparent, will act to move the collar 119 along shaft 115 so as to swing the lever arm 121 in a clockwise direction about the pivot pin 80 as viewed in Fig. 5, thereby causing the lever end 82 to move inwardly to actuate one of the transmission controlling devices. It will furthermore be apparent that when the spring 113 is operating as aforesaid to actuate one of the transmission controlling devices, the adjusting lever D will not respond to selective adjustment by manipulation of the selector arm 87 without first relieving the spring 113. In other words, the adjusting lever D cannot be moved until the pressure of spring 113 is relieved to permit the lever D to move from the position illustrated in Fig. 6 to the released position illustrated in Fig. 5 and, in order to assist the releasing movement of the lever, a relatively light spring 123 may be provided, this spring acting to cause the lever arm 121 to follow the rearward movement of collar 119.

The spring 123 acts between a fixed flange 123ª and a cup 123ᵇ slidable along shaft 115, the cup bearing against the lever arm 121. The forward end of a key 123ᶜ limits rearward movement of cup 123ᵇ and prevents tendency of the opposing springs 123 and 113 to bind lever arm 121 against adjustable swinging movement when the load of spring 113 is removed from the lever end 121 according to the Fig. 5 position of these parts. The key 123ᶜ projects outwardly from shaft 115, collar 119 having a key slot 123ᵈ receiving key 123ᶜ. When spring 113 expands, the collar 119 and lever arm 121 move forwardly of shaft 115 as will be presently apparent.

I will next describe the construction and operation of the power operating means for releasing the spring 113 and thus for releasing the various transmission speed ratio controlling devices 22, 23, 24, and 25. Referring particularly to Figs. 1, 4, 5, and 6, the aforesaid sleeve or hollow shaft 19 extends rearwardly and is formed with an annular clutching member 124 adapted for clutching engagement with a cooperating clutching element or collar 125, the latter carrying the friction clutching material 126 engageable with the clutching element 124. The collar 125 is splined at 127 to receive a sleeve 128, this sleeve having internal threads 129 of relatively great pitch engaging corresponding threads 130 formed exteriorly on a fixed sleeve 131. The sleeve 131 rotatably receives the shaft 17 which extends rearwardly therethrough to operate the various planetary gear trains of the transmission. The sleeve 131 has a forward annular shoulder 132 adapted to limit forward movement of sleeve 128 and the sleeve 131 has a rear annular flange 133 which, as best seen in Fig. 5, is formed with an upwardly extending bracket portion 134 fixed by a suitable fastener 135 to a depending arm 136 carried by the transmission casing.

In order to move the collar 125 into clutching engagement with the clutch element 124, I have provided a suitable manually controlled mechanism, which, in the present embodiment of my invention, comprises a pedal 137 illustrated in Fig. 1 as being located for convenient manipulation by the foot of the vehicle driver. The pedal 137 is pivotally supported at 138 and has a downwardly extending lever arm 139 pivotally connected at 140 to actuate a rod 141 which extends rearwardly for pivotal connection at 142 with a lever 143. This lever is pivotally mounted at 144 and is provided with an inwardly extending yoke 145 operating in the annular groove 146 of the collar 125.

It will be apparent that when the vehicle operator depresses the pedal 137, the lever motion is transmitted to the yoke 145 so as to move the clutching material 126 into clutching engagement with the clutch element 124 and thereby operably connect the clutch members 124 and 125 so as to drive the latter from the engine. When the pedal 137 is released, a suitable spring 147 will operate to return the pedal to its normal position as determined by the adjustable stop 148.

The sleeve 128 is provided with an annular groove 149 best shown in Fig. 5 as receiving the inwardly extending yoke portion 150 of a lever arm 151 pivotally mounted at 152 to a bracket structure 153 which projects rearwardly from the transmission casing. The lever arm 151 is formed with a second lever portion 154 which is formed with the aforesaid yoked lever end 120 operating in groove 119ª of collar 119.

In operation of the power operated releasing means, it will be noted that in Fig. 6 the lever D is operating under expansion of spring 113 to actuate the third speed controlling device 24, through compression of spring 71 associated with rod 57. It will also be noted that in Fig. 6 the expansion of spring 113 has moved lever 154 on its pivot 152 so as to cause the lever yoke 150 to act on the sleeve 128 and move this sleeve rearwardly on the threads 129, 130, into the Fig. 6 position.

When the selector arm 87 is manipulated to change the transmission from the third speed drive to some other condition of control, it will be apparent that the lever 79 cannot act to adjust the lever D until the lever D is swung on the pivot pin 80 to retract the lever end 82 away from contact with the opening 65 of the third speed rod 57.

In order to produce this releasing action of the adjustable lever D, the operator depresses the pedal 137 to drivingly connect the clutch members 124 and 125 as aforesaid, whereupon the sleeve 128 will be rotated. Rotation of the sleeve 128 will cause the sleeve to move on the threads of sleeve 133 from the Fig. 6 position into the Fig. 4 position, the splines 127 accommodating such movement, whereupon the lever arm 82 of the lever D will be swung sufficiently to clear the forward face of bracket 64 and under such conditions the lever D will immediately respond to the preselected adjustment of the shaft 93 so as to align the lever end 82 with another of the terminal portions of the rods 57, 57ª, 57ᵇ or 57ᶜ. When this action has taken place the operator releases the pedal 137, and in the event that the pedal is held in a depressed condition longer than the time necessary for completion of the forward movement of sleeve 128, the clutch parts 124 and 125 will relatively slip. The operator will soon become accustomed to the period of time necessary for releasing action of the adjustable lever D, such time being very brief and requiring only a momentary tripping of the pedal 137.

With the sleeve 128 in the forward position, and on release of pedal 137, it being further presumed that the lever end 82 of lever D is aligned with one of the aforesaid terminal rod portions, the spring 113 will swing the lever D in its operating movement and simultaneously therewith the spring actuated collar 119 will act on the lever end 120 to restore the sleeve 128 from the Fig. 4 position back to the Fig. 6 position ready for further operation under engine power when the pedal 137 is again actuated.

In Fig. 4 the end 82 of lever D is illustrated in engagement with the neutral face 73 so as to correspond with the setting of the selector arm 87 illustrated in Fig. 1, it being apparent that under such conditions the spring 113 cannot act to expand but will be held in the compressed condition. When the vehicle driver adjusts the selector arm 87 from the neutral notch 112 into engagement with the first speed notch 108 by way of example, the lever D will correspondingly move into contact with the first speed terminal portion 67 of rod 57a at such time as the vehicle operator depresses the pedal 137. When the pedal is depressed, the sleeve 128 has a small amount of movement in taking up the clearance indicated at 156 between flange 132 and the forward end of sleeve 128, this amount of movement being sufficient to slightly move collar 119 rearwardly to unload the lever end 82 from the neutral face 73 and thereby relieve the pressure of engagement of these parts. When this pressure is thus released, the lever D will immediately adjust itself under the influence of the selector mechanism illustrated in Fig. 7 so as to engage the first speed terminal 67 in the foregoing assumed illustration.

Briefly reviewing the operation of the power transmission mechanism as a whole, let it be presumed that the transmission is in its neutral setting, this being the position of the parts as illustrated in Figs. 1, 2, 3, 4, 5, and 7. Under such conditions the engine A will not operate the power shaft 10 through the transmission C and the various controlling devices 22, 23, 24, and 25 thereof will be released according to the showing of the third speed controlling device 24 of Fig. 3.

Let it be presumed that the vehicle driver desires to operate the vehicle in the low gear whereupon he will adjust the selector arm 87 from the neutral notch 112 into engagement with the first speed notch 108. Such movement will raise the shaft 93 (see Fig. 7) so as to yieldingly urge the lever 79 to move upwardly but such movement is prevented by reason of the force of spring 113 acting on the adjustable lever D in engagement with the neutral face 73 as best seen in Fig. 4. In order to cause the transmission to shift into the low gear so as to actuate the first speed braking device 22, the vehicle operator momentarily depresses the pedal 137 so as to connect the clutching parts 124 and 125 and the drive is thereupon transmitted to the sleeve 128 to release the lever D from the neutral face 73 and further compress the spring 113. When the lever D is thus released, it is free to immediately adjust itself into the position for engaging the first speed terminal portion 67, and on release of the pedal 137 the power operating spring 113 is free to act to actuate the lever D so as to compress the spring 71 associated with rod 57a, the latter rod being moved rearwardly so as to cause operation of the first speed brake controlling device 22. The transmission will now be driven in the forward low gear.

When it is desired to manipulate the transmission into the second or intermediate gear ratio, the vehicle driver adjusts the selector arm 87 from engagement with the aforesaid first speed notch 108 into engagement with the second speed notch 109, and when the pedal 137 is momentarily depressed to cause the lever 151 to unload the spring 113, the lever D will adjust itself into engagement with the second speed terminal 68. Meantime, the first speed controlling device 22 will be released through the influence of the first speed spring 71 associated with rod 57a and also by reason of the inherent resilience in the band 26 associated with the braking device of the first speed and, when pedal 137 is released, the spring 113 will again swing the lever D to actuate the second speed controlling device 23 and the motor vehicle will then be driven in the second speed ratio.

Likewise it will be readily understood that the third speed brake controlling device may be operated. It will be apparent that it is not necessary to follow a sequence of manipulation of the transmission through its various gear ratios. For example, when the transmission is in the neutral condition, the operator may move the selector arm 87 directly from engagement with the neutral notch 112 into engagement with either the second speed notch 109 or the third speed notch 110. In either event, when the control pedal 137 is momentarily depressed, the adjustable lever D will respond to engage either the second speed terminal 68 or the third speed terminal 66 as the case may be. Also, it will be readily apparent that the vehicle operator may at any time adjust the transmission into a lower speed ratio condition from any condition of forward drive by simply manipulating the selector arm 87 into the corresponding notch of the selector segment 83 followed by a momentary depression of the pedal 137.

When it is desired to drive the motor vehicle in reverse, the selector arm 87 is manipulated into engagement with the reverse notch 111 and, when the pedal 137 is depressed, the lever D will be caused to engage the terminal 69 of the reverse actuating rod 57c so that on release of pedal 137 the spring 113 will act through the lever D to operate the reverse controlling device 25 and the motor vehicle will then be driven in the reverse direction.

Referring now to the modification of my invention illustrated in Fig. 8, I have provided a somewhat different form of power operating means in place of the clutch elements 124 and 125 of the Fig. 4 embodiment. It should be understood that in Fig. 8 the power transmission system is, for the most part, identical with that previously described, although in order to avoid undue duplication I have illustrated only a part of the mechanism as will be readily understood. Where the parts of Fig. 8 as illustrated are duplicated from the mechanism previously described, I have used similar reference characters and where such parts are generally similar in function I have used primed reference characters. In Fig. 8 I have omitted the engine, main clutch, and all of the speed ratio transmission controlling devices with the exception of one of these devices and the mechanism associated therewith. Thus, in Fig. 8 the third speed controlling device 24 is illustrated together with the same operating mechanism as was previously described in connection with the third speed controlling device. Furthermore, the same adjustable lever D is employed and is adapted for preselected manual adjustment for controlling the various speed ratio devices. In Fig. 8 the power means for actuating the lever D is illustrated in the form of a spring 113' corresponding in function and structure with the aforesaid spring 113, and the power operating means for releasing the lever D and the controlling devices consists of a hydraulically operated mechanism.

In Fig. 8 the shaft 115' is axially movable in suitable guides, one of which is shown at 159, and the collar 119' is securely fixed to shaft 115' by a transverse pin 160.

Driven from a shaft 19', which preferably corresponds to the aforesaid shaft 19 but which may correspond to the aforesaid shaft 17, is a pump 161. The pump 161 is diagrammatically portrayed and may be of any suitable type, this pump being driven from a gear 162 carried by shaft 19', this gear meshing with a driven gear 163 mounted on the pump driving shaft 164. The pump 161 is adapted to draw a supply of oil from the reservoir or sump 165, this reservoir being also illustrated in Figs. 1 and 3 for storing a suitable lubricant used in Fig. 1 to lubricate the moving parts of the transmission gearing. In Fig. 8 the oil under pressure from pump 161 is delivered through a conduit 166 to a valve cylinder 167. This cylinder slidably receives a valve 168 having a passage 169 positioned in Fig. 8 to establish communication between the delivery conduit 166 and a return conduit 170 which leads back to the reservoir 165 as indicated by the dotted lines. The valve 168 is adjusted through linkage 171 pivotally connected at 172 with the same pedal 137 as aforesaid.

Branched from the delivery conduit 166 is a branch conduit 173 opening to a pressure cylinder 174 slidably receiving a piston 175 which is connected to the forwardly extending end of the shaft 115'.

In operation of the Fig. 8 embodiment, the pedal 137 has just been released from a depressed condition so as to move the valve 168 to establish communication between the pressure conduit 166 and the return conduit 170. In such position of the valve, the fluid pressure will be relieved in the cylinder 174 and spring 113' will then actuate the shaft 115' forwardly so as to swing the lever D about its pivot 80 to push the terminal which may be aligned with the lever so as to apply the corresponding braking device of the transmission. When a change in the gear ratio is desired, the vehicle driver manipulates the aforesaid selector arm 87 and, when the pedal 137 is depressed, the valve 168 is moved rearwardly so as to close communication between conduits 166 and 170 whereupon the pressure will build up in cylinder 174 from the operation of pump 161. This causes the piston 175 to move rearwardly in cylinder 174, the shaft 115' also moving rearwardly to unload the spring 113' from the lever D. The lever D is then free to adjust itself on the pivoting supporting shaft 75 so as to register the lever with another of the push rods leading to another of the transmission controlling devices, and when the pedal 137 is released the conduits 166 and 170 will again be in communication and spring 113' will then act to swing the lever D in its operating stroke. The various speed ratio changes will not again be repeated, it being understood that the power transmission system of Fig. 8 is adapted for operation in a manner corresponding to that previously described in connection with the Fig. 1 embodiment.

Various modifications and changes will be readily apparent from the teachings of my invention, as set forth in the appended claims, and it is not my intention to limit my invention to the particular details of construction and operation shown and described for illustrative purposes.

What I claim is:

1. In a motor vehicle transmission having a plurality of speed ratio controlling devices, means operably associated with each of said controlling devices for actuating said devices, an adjustable operating element adapted for selective operative connection with said actuating means for said controlling devices, manually operated means for yieldingly urging said operating element selectively to its positions of adjustment in advance of adjusting movement thereof, and power operating means for alternately actuating and releasing said operating element.

2. In a motor vehicle transmission having a plurality of speed ratio controlling devices, means operably associated with each of said controlling devices for actuating said devices, an adjustable operating lever pivoted intermediate its ends and having one end thereof adapted for selective operative connection with said actuating means for said controlling devices, manually operated means for selectively adjusting said lever, and power means for loading the other end of said lever.

3. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, adjustable operating means adapted for selective operative connection with said actuating means, manually operated means for selectively adjusting said adjustable means, and power operating means adapted for operation by the vehicle driving motor for actuating said adjustable means.

4. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, adjustable operating means adapted for selective operative connection with said actuating means, manually operated means for yieldingly urging said adjustable means selectively to its positions of adjustment in advance of adjusting movement thereof, and power operating means for alternately actuating and releasing said adjustable means.

5. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, an adjustable operating element adapted for selective operative connection with said actuating means, manually operated means for yieldingly urging said operating element selectively to its positions of adjustment in advance of adjusting movement thereof, and power operating means for alternately actuating and releasing said operating element.

6. In a motor vehicle planetary transmission having a plurality of speed ratio planetary gear trains and rotary controlling drums associated therewith, braking means for resisting rotation of each of said drums, means operably associated with each of said braking means and adapted to actuate the respective braking means, an adjustable operating lever pivoted intermediate its ends and having one end thereof adapted for selective operative connection with said actuating means for said braking means, manually operated means for selectively adjusting said lever, and power means for loading the other end of said lever.

7. In a motor vehicle planetary transmission having a plurality of speed ratio planetary gear trains and rotary controlling drums associated therewith, braking means for resisting rotation of each of said drums, a shaft for each of said braking means, each of said shafts having oppositely threaded portions thereof engaging its associated braking means and adapted when rotated to actuate said braking means, levers respectively connected to said shafts and projecting laterally therefrom, power operating means for actuating said levers to rotate said shafts, and manually operated means for selectively controlling operation of said braking means by said power means.

8. In an engine driven vehicle power transmission having a plurality of speed ratio controlling devices, a shaft driven by said engine, means operably associated with each of said controlling devices for actuating said devices, adjustable operating means adapted for selective operative connection with said actuating means for said controlling devices, manually operated means for selectively adjusting said adjustable operating means, said adjustable operating means being adapted for further actuation alternately in substantially opposite directions to respectively release and to actuate said controlling devices, means for actuating said adjustable operating means in one of said directions, and means for clutching said shaft with said adjustable operating means for actuating said adjustable operating means in the other of said directions.

9. In an engine driven vehicle power transmission having a plurality of speed ratio controlling devices, a shaft driven by said engine, means operably associated with each of said controlling devices for actuating said devices, adjustable operating means adapted for selective operative connection with said actuating means for said controlling devices, manually operated means for selectively adjusting said adjustable operating means, said adjustable operating means being adapted for further actuation alternately in substantially opposite directions to respectively release and to actuate said controlling devices, means for actuating said adjustable operating means in one of said directions to release said controlling devices, and means for clutching said shaft with said adjustable operating means for actuating said adjustable operating means in the other of said directions to selectively actuate said controlling devices.

10. In an engine driven vehicle power transmission having a plurality of speed ratio controlling devices, a shaft driven by said engine, means operably associated with each of said controlling devices for actuating said devices, adjustable operating means adapted for selective operative connection with said actuating means for said controlling devices, manually operated means for selectively adjusting said adjustable operating means being adapted for further actuation alternately in substantially opposite directions to respectively release and to actuate said controlling devices, means for actuating said adjustable operating means in one of said directions, and means for clutching said shaft with said adjustable operating means for actuating said adjustable operating means in the other of said directions, said manually operated means including yielding means urging said adjustable operating means selectively to its positions of adjustment in advance of adjusting movement thereof, said yielding means acting to adjust said adjustable operating means in response to said releasing actuation thereof.

11. In a motor vehicle planetary transmission having a speed ratio rotary controlling drum, braking means associated with said drum for resisting rotation thereof, said braking means including a band substantially surrounding said drum to provide opposite ends thereof positioned substantially adjacent each other, a shaft having oppositely threaded portions thereof respectively threadedly engaging said band ends whereby to expand and contract said band in response to alternate rotation of said shaft in opposite directions, a lever projecting from said shaft, a rod having one end thereof connected to said shaft and having its other end spaced from said lever in a direction substantially longitudinally of the drum axis, a spring acting on said rod for yieldingly urging the rod to rotate said shaft in one of its directions to expand said band, a control lever, means for pivotally supporting said control lever intermediate its ends for swinging movement in two directions, means adapted for manual operation for swinging said control lever in one of said directions to selectively engage and disengage one end thereof with said spaced rod end, said control lever having its other end provided with a slot, a second shaft extending through said lever slot, a second spring surrounding said shaft and adapted to load said slotted lever end for swinging said control lever in the other of said directions to actuate said rod and thereby contract said band, and power operated means adapted to compress said second spring and thereby unload said control lever.

12. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating lever adapted for selectively adjustable operable connection with said actuating means for said braking means, manually controlled means for selectively adjusting said lever, and power means adapted to act on said lever for transmitting braking force therethrough to operate said lever in its positions of selective adjustment.

13. In a motor vehicle transmission having a plurality of speed ratio controlling devices, means operably associated with each of said controlling devices for actuating said devices, an adjustable operating element adapted for selectively adjustable operable connection with said actuating means for said controlling devices, manually controlled selector means adapted to exercise a selecting influence on said operating element in advance of selective adjustment thereof, and manually controlled means for operating said element under power in its positions of selective adjustment, said manually controlled selector means acting to selectively adjust said operating element in response to release of said operating element from the operating force of said power operating means.

14. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted for selectively adjustable operable connection with said actuating means for said braking means, manually controlled selector means adapted to exercise a selecting influence on said operating element in advance of selective adjustment thereof, and power means for operating said element in its positions of selective adjustment for transmitting braking force therethrough, said manually controlled selector means acting to selectively adjust said operating element in response to release of said operating element from the brake operating force of said power means.

15. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted for selective operative connection to said brake actuating means, a manually adjustable selector member, yielding connecting means between said selector member and said operating element adapted upon adjustment of said selector member to yieldingly urge selective adjustment of said operating element in advance of adjusting movement thereof, and power operating means adapted to apply braking force to said operating element whereby to selectively operate said braking means.

16. In an engine driven vehicle transmission having a plurality of speed ratio controlling devices, a shaft adapted to be driven by the engine, means operably associated with each of said controlling devices for actuating said devices, an adjustable operating member adapted for selective operative connection with said actuating means for said controlling devices, manually controlled means for adjusting said adjustable operating member to provide said selective operative connections, and means driven from said shaft for operating said adjustable operating member in said positions of selective adjustment thereof.

17. In an engine driven vehicle transmission of the planetary gear type having a plurality of rotary speed ratio controlling elements, brake means for each of said rotary elements, means for actuating each of said brake means, an adjustable operating member adapted for selective operative connection with said brake actuating means for said brake means, manually controlled means for adjusting said adjustable operating member to provide said selective operative connections, and means driven from said shaft for transmitting braking force to said adjustable operating member in said positions of selective adjustment thereof.

18. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted to apply braking force in positions of selective adjustment thereof to said actuating means for said braking means, means for pivotally mounting said element on a stationary part of the transmission for swinging movement about a pair of separate axes disposed generally transversely to each other, manually controlled means for selectively adjusting said operating element about one of said axes, and means for operating said element in its said positions of selective adjustment in successive movements about the other of said axes for alternately applying and releasing braking force at said braking means, said operating means including fluid pressure applying means adapted to operate said element for at least one of its said successive movements.

19. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted to apply braking force in positions of selective adjustment thereof to said actuating means for said braking means, manually controlled means for selectively adjusting said operating element, and means for operating said element in its said positions of selective adjustment in successive movements for alternately applying and releasing braking force at said braking means, said operating means including fluid pressure applying means adapted to operate said element in said movement of braking force release.

20. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted to apply braking force in positions of selective adjustment thereof to said actuating means for said braking means, manually controlled means for selectively adjusting said operating element, and means for operating said element in its said positions of selective adjustment in successive movements for alternately applying and releasing braking force at said braking means, said operating means including a piston operably connected to said operating element to operate said element for at least one of its said successive movements, a cylinder for said piston, a pump for supplying fluid under pressure to said cylinder, and valving means controlling the supply of said fluid to said cylinder.

21. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted to apply braking force in positions of selective adjustment thereof to said actuating means for said braking means, manually controlled means for selectively adjusting said operating element, and means for operating said element in its said positions of selective adjustment in successive movements for alternately applying and releasing braking force at said braking means, said operating means including fluid pressure applying means adapted to operate said element for one of said successive movements and a spring adapted to operate said element for the other of said successive movements.

22. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted to apply braking force in positions of selective adjustment thereof to said actuating means for said braking means, manually controlled means for selectively adjusting said operating element, means for operating said element in its said positions of selective adjustment in successive movements for alternately applying and releasing braking force at said braking means, said operating means including a piston operably connected to said operating element to operate said element for one of its said successive movements, a cylinder for said piston, a pump for supplying fluid under pressure to said cylinder, valving means controlling the supply of said fluid to said cylinder, and a spring adapted to operate said element for the other of said successive movements.

23. In an engine driven vehicle transmission of the planetary gear type having a plurality of rotary speed ratio controlling elements, brake means for each of said rotary elements, means for actuating each of said brake means, an adjustable operating member adapted for selective operative connection with said brake actuating means for said brake means, manually controlled means for adjusting said adjustable operating member to provide said selective operative connections, means driven from said shaft for transmitting braking force to said adjustable operating member in said positions of selective adjustment thereof, and manually controlled clutch means for controlling the drive from said shaft to said shaft driven means.

24. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, an adjustable operating element adapted to apply braking force in positions of selective adjustment thereof to said actuating means for said braking means, means for pivotally mounting said element on a stationary part of the transmission for swinging movement about a pair of separate axes disposed generally transversely to each other, means for selectively adjusting said operating element about one of said axes, and means for operating said element in its said positions of selective adjustment in successive movements about the other of said axes for alternately applying and releasing braking force at said braking means, said operating means including fluid pressure applying means adapted to operate said element for at least one of its said successive movements.

25. In a motor vehicle transmission having a plurality of speed ratio planetary gear trains and rotary controlling elements associated therewith, braking means for resisting rotation of each of said rotary elements, means operably associated with each of said braking means and adapted to actuate the respective braking means, said actuating means including a lever projecting outwardly from each of said rotary elements, a rod operably connected at one end thereof to each of said levers, said rods having their other ends grouped adjacent each other, an adjustable common operating lever adapted for selectively adjustable operable connection with said grouped rod ends, means for selectively adjusting said common lever, and power means adapted to act on said common lever for transmitting braking force therethrough to operate said lever in its positions of selective adjustment.

26. In an engine driven vehicle transmission having a plurality of speed ratio brake controlling devices, a shaft adapted to be driven by the engine, brake operating means for selectively operating said brake controlling devices, manually operable means for controlling the selective operation of said brake operating means, and means for drivingly coupling said shaft with said brake operating means for operating the latter under power.

HERBERT F. PATTERSON.